United States Patent [19]

Neiheisel et al.

[11] Patent Number: 5,045,668

[45] Date of Patent: Sep. 3, 1991

[54] APPARATUS AND METHOD FOR AUTOMATICALLY ALIGNING A WELDING DEVICE FOR BUTT WELDING WORKPIECES

[75] Inventors: Gary L. Neiheisel, Cincinnati; William W. Nagle, Hillsboro; Robert J. Justice, Hamilton; Bradley R. Hoover, Hamilton, all of Ohio

[73] Assignee: Armco Inc., Middletown, Ohio

[21] Appl. No.: 508,904

[22] Filed: Apr. 12, 1990

[51] Int. Cl.$^5$ ............................................. B23K 26/02
[52] U.S. Cl. .......................... 219/121.83; 219/121.63; 219/121.74; 219/121.78; 219/121.82; 219/121.84
[58] Field of Search ...................... 219/121.83, 121.63, 219/121.64, 121.67, 121.72, 124.34

[56] References Cited

U.S. PATENT DOCUMENTS

| | | | |
|---|---|---|---|
| 3,701,881 | 10/1972 | Rother et al. | 219/123 |
| 4,000,392 | 12/1976 | Banas et al. | 219/121.85 |
| 4,410,787 | 10/1983 | Kremers et al. | 219/124.34 |
| 4,532,404 | 7/1985 | Boillot et al. | 219/124.34 |
| 4,568,816 | 2/1986 | Casler, Jr. | 219/124.34 |
| 4,577,088 | 3/1986 | Sharp et al. | 219/121.64 |
| 4,623,777 | 11/1986 | Aihara et al. | 219/121.6 |
| 4,700,045 | 10/1987 | Merry et al. | 219/121.78 |
| 4,765,532 | 8/1988 | Uomoti et al. | 228/212 |
| 4,769,522 | 9/1988 | Lentz et al. | 219/121.63 |
| 4,806,732 | 2/1989 | Abshire et al. | 219/124.34 |
| 4,820,897 | 4/1989 | Lefevre | 219/121.61 X |

FOREIGN PATENT DOCUMENTS 1360380  7/1974  United Kingdom .

OTHER PUBLICATIONS

"Coaxial Arc Weld Pool Viewing for Process Monitoring & Control," R. W. Richardson, D. A. Gutow, R. A. Anderson & B. F. Farson *Welding Journal*, Mar., 1984, pp. 43–50.

"A Real-Time Optical Profile Sensor for Robot Arc Welding," G. L. Oomen & W. J. P. A. Verbeek, *Robotic Weldings*.

Commercial Literature from Oldelft. Corp. of America entitled "The Robot's Eye" describes a Seampilot optical profile sensor system.

Promotional Material from MVS Modular Vision Systems, Inc. entitled "Laser Vision".

"High Speed Laser Welding of Deep Drawing Laser Carbon Steel" Gary L. Neiheisel. Presented to ICALEO, Oct. 30–Nov. 4, 1988.

*Primary Examiner*—C. L. Albritton
*Attorney, Agent, or Firm*—Frost & Jacobs

[57] ABSTRACT

Apparatus and method for aligning a welding device along the center of a gap defined by confronting edges of at least two workpieces to be joined, wherein relative motion between the welding device and the workpiece gap occurs along a longitudinal axis substantially parallel to the gap such that the proximal edges of the workpieces can be joined by forming a weld seam along the gap during the relative motion. The apparatus preferably includes an imaging system for determining the location of the gap center relative to a predetermined two dimensional coordinate system by monitoring an image of a vision area along the gap downstream of the welding zone. In a preferred embodiment, the imaging system is effectively isolated from the welding zone through use of a high magnification optics system, a shroud structure, an independent light source, and a vectored jet of inert gas supplied to the welding zone.

30 Claims, 7 Drawing Sheets

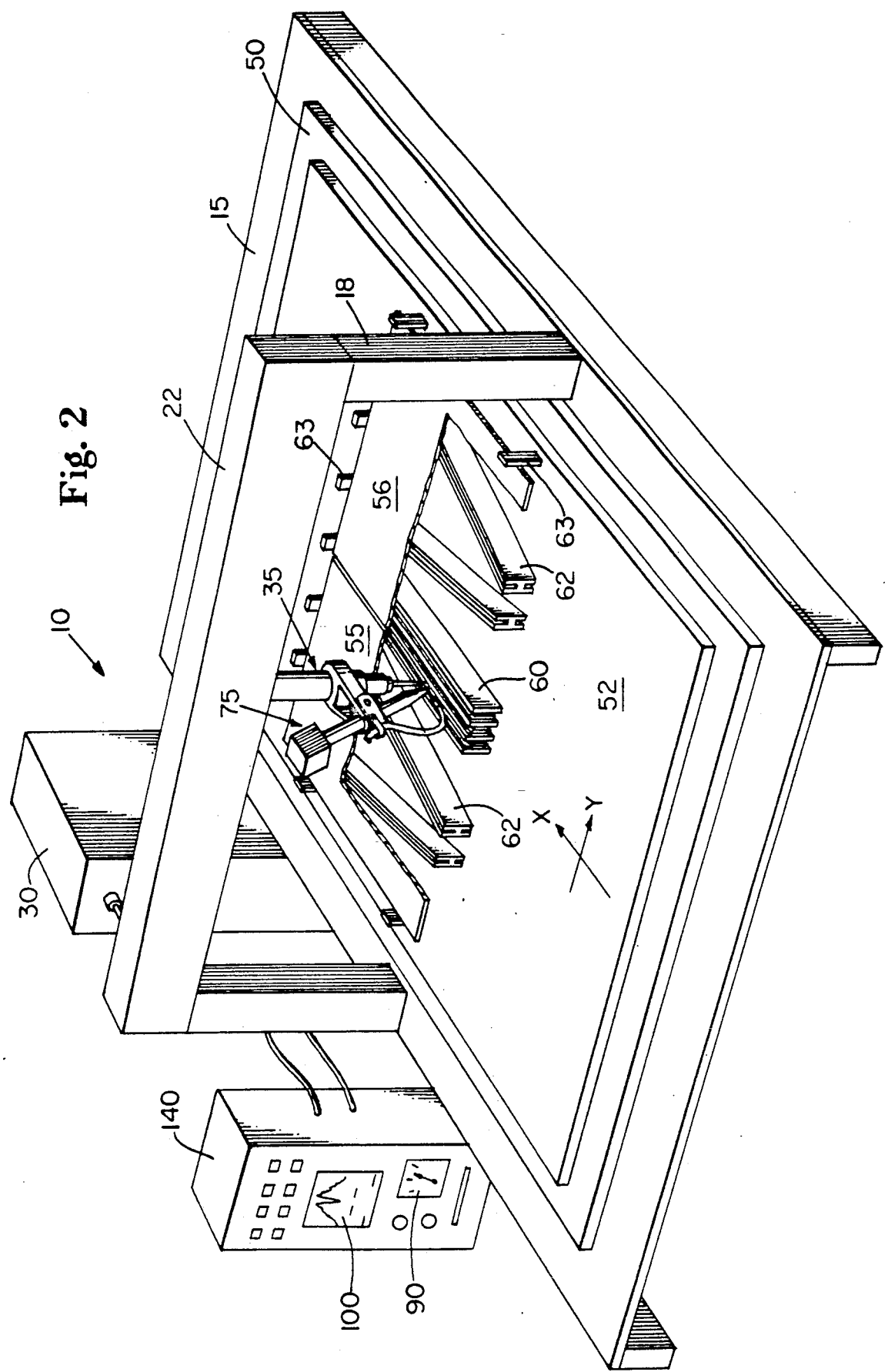

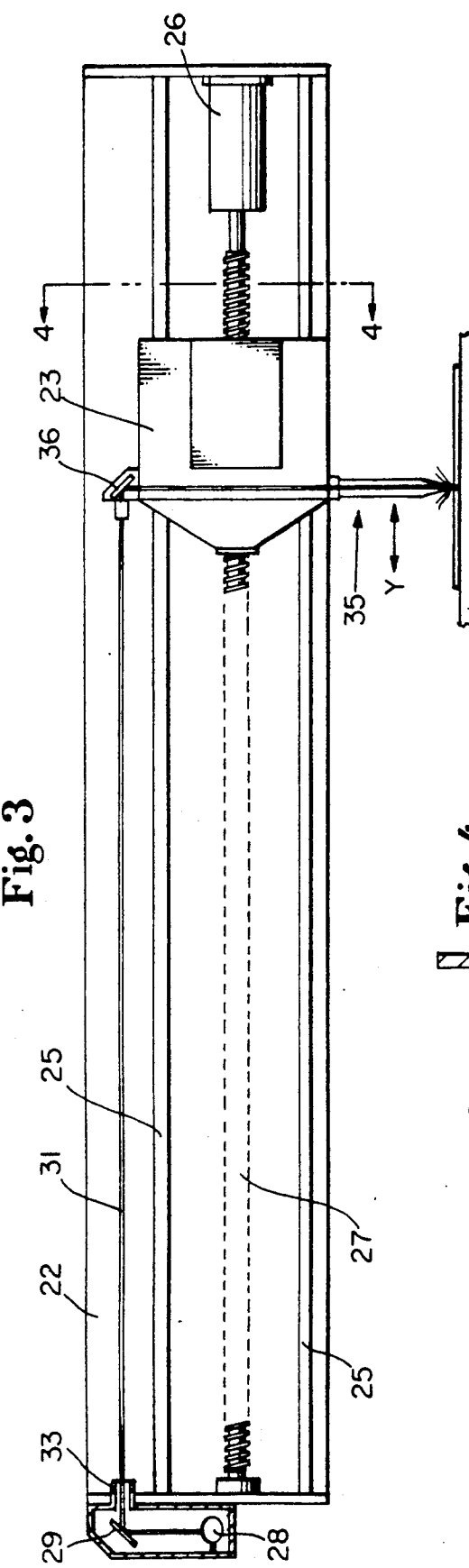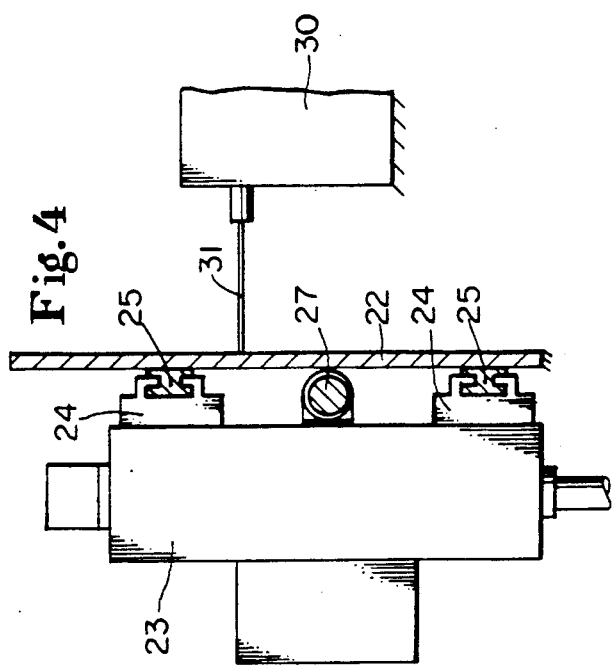

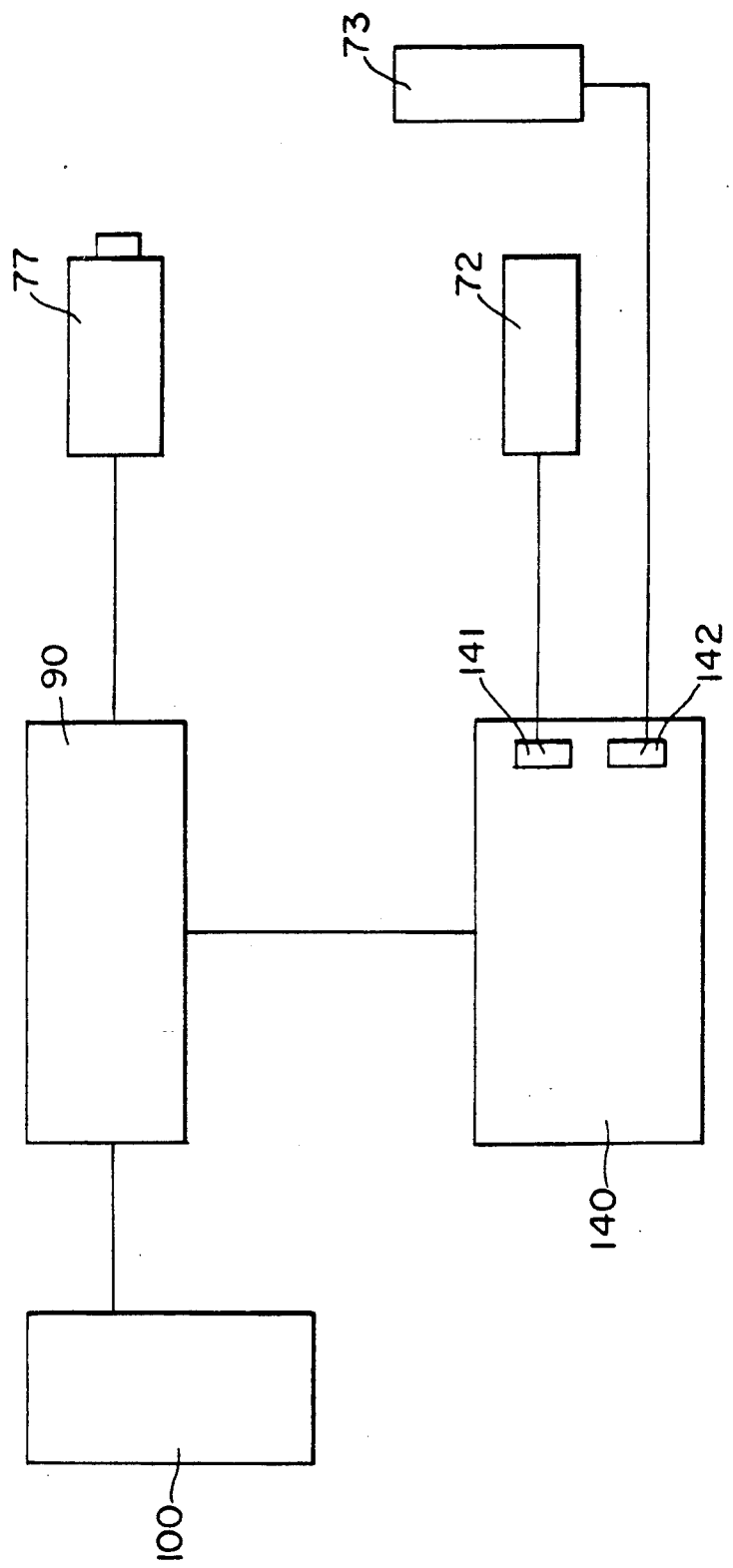

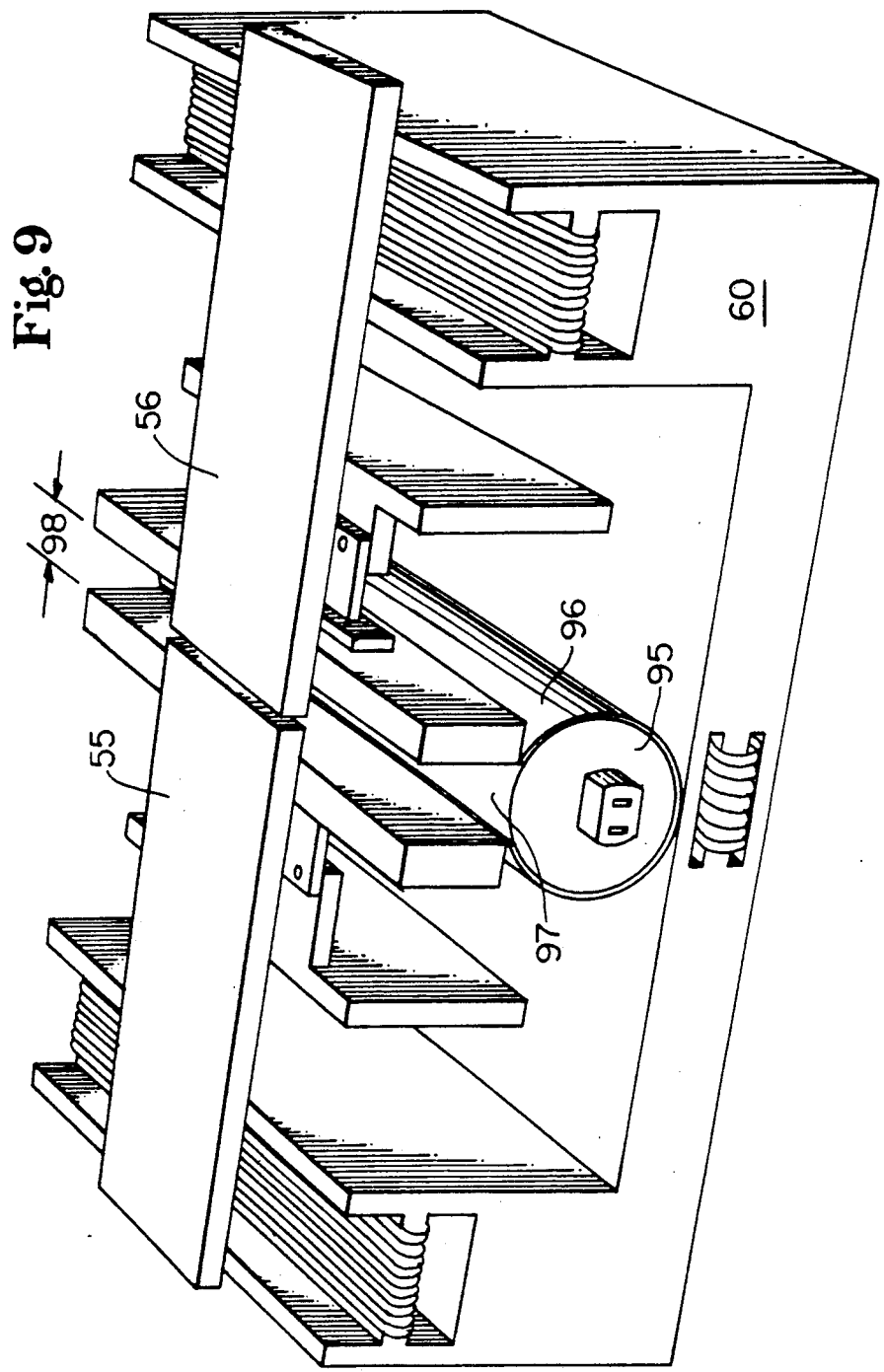

APPARATUS AND METHOD FOR AUTOMATICALLY ALIGNING A WELDING DEVICE FOR BUTT WELDING WORKPIECES

TECHNICAL FIELD

This invention relates to an apparatus and method for aligning a welding device along a gap between confronting edges of at least two workpieces to be butt welded, and, more particularly, to an apparatus and method for automatically aligning a welding device with the center of a gap between confronting edges of at least two workpieces to be joined during relative motion between the welding device and the workpieces, wherein the apparatus includes a vision imaging system which is effectively isolated from the welding point and the effects of welding thereon.

BACKGROUND ART

In a wide variety of manufacturing and steel processing applications, it is often desirable or necessary to join together sheets or strips of steel or similar materials such as alloys or the like, such as by welding. This also may include joining sheets of different material or thickness in order to custom make or "tailor" a part. Such joining can be accomplished by conventional seam welding equipment, arc welding apparatus, high energy lasers, electron beam or plasma arc welding devices.

Because the quality of the seam weld must be at least equivalent to the base metal in mechanical and microstructural properties, it is essential to optimize the quality of the weld in many of today's advanced technology applications. In particular, the quality of the weld can affect the overall microstructure, microhardness, tensile properties, formability, fatigue strength and fracture toughness, which all directly affect the overall value of the joining process and the character of the resulting joined pieces. In turn, the ability of the welding device to accurately track the gap between two abutted sheets to be joined is critical to ensuring an optimal weld, especially in high speed welding applications utilizing tightly focused energy beams where the application point of the weld must be continuously maintained in close alignment with the center of the gap.

A uniform weld profile, in large part, is determined not only by the registration of the opposing proximal edges of workpieces to be joined, but by the ability of a tracking system to compensate for mis-positioning of the gap between two abutted workpieces in a translational sense. Accordingly, there have been substantial efforts to develop practical and reliable seam tracking systems for use in such applications.

One approach for the tracking of the gap to be welded is the use of contacting probes. Such systems generally utilize the physical characteristics of the workpieces and/or their contiguous gap as a mechanical guide for a sliding or rolling mechanism to which the welding head is linked. A tracking system of this design precedes, or is laterally spaced to the side of, the welding head and occupies a significant physical volume adjacent the vicinity of the point of welding (or welding zone). Implementation of contacting systems can vary from simple mechanical designs in which forward motion by the workpieces produces an aligning transverse force on the welding head manipulator, to sophisticated, computer controlled electro-mechanical systems in which forces on the probe are sensed electronically and utilized to activate drive motors. These systems, however, often lose contact with the joint, which can interrupt the operation of the tracking device and compromise the weld quality. Generally, such systems are limited to low welding speeds and particular applications (e.g., where there are predetermined or controlled physical characteristics of the workpieces to be joined and their contiguous gap), and are subject to fluctuations in sensitivity as well as damage from heat, wear and other abuse.

Accordingly, use of various non-contacting probes has been attempted to address the aforementioned limitations, while providing more information about the weld joint (especially the edge conditions thereof). Whereas a contacting probe system may sense only a predetermined number (e.g., one or two) of points along a gap, a non-contacting sensor may be able to repeatedly scan across the gap to be welded to provide an effective "map" of the gap geometry. Many non-contacting sensing media have been investigated, including those utilizing magnetics and electro-magnetics (reluctance and eddy current types), fluidics and pneumatics, sound propagation, and visible and infrared imaging. In this area, use of visible imaging and arc sensing have received the most recent serious attention.

Arc sensing, as exemplified by Abshire, et al. U.S. Pat. No. 4,806,732, is based on the relationship that the electrical characteristics of the arc depend on the distance between the welding head and the workpiece. Thus, motion of the welding head back and forth across the gap produces a varying electrical response (arc voltage and/or current) which can be electronically analyzed for recognition of gap details. This is advantageous because there is no sensor of appreciable size to inhibit the welding head, and the sensing is performed at the point of welding. On the other hand, in arc sensing systems, the welding head or arc must be oscillated transverse to the gap or joint, and small electrical variations may be difficult to detect and distinguish from inherently fluctuating arc characteristics. Additionally, the joint cannot be sensed prior to arc initiation for prepositioning of the torch (since electrical characteristics of the arc cannot be sensed until the welding head is between the workpieces), and dimensional resolution of the system is also limited.

Visual imaging systems have also been utilized in various tracking systems. One such system is generally referred to as a non-structured light system, where an imaging device views the weld area (usually the joint in advance of the point of welding) with general illumination, such as that provided by the welding arc or an auxiliary high intensity light source. The image is analyzed according to the varying levels of illumination viewed for features representative of the joint preparation. This type of visual imaging system has been especially successful for the welding of butt joints where a distinct joint clearance exists between abutted flat workpieces. Although such systems are non-contacting, the imaging system is generally directed to an area in advance (or ahead) of the point of welding and may thus be considered intrusive to the weld area and highly directional.

Visual imaging has also been utilized in tracking systems which provide structured light systems having a particular pattern of light projection. In these systems, the light may be a focused beam, or a plane or multiple planes of light projected at an angle to the imaging system. Recognition of the particular light wavelength allows sensing of a reflection pattern of the light from the workpiece, which in turn permits an optical triangulation calculation to be performed to locate a point or points on the workpiece. This allows various ranges of resolution for the joint region contour to be analyzed by the projection and imaging system. The light projection device usually is a high intensity strobe lamp or laser having an intensity or distinct wavelength which can be discerned even in the presence of the arc. The structured light system also generally senses an area spaced ahead of the zone of welding, and may also be considered intrusive to the welding area and directional, although non-contacting. Additionally, such systems generally are complicated by requiring additional computer memory and software to perform algorithms for use with the triangulation techniques.

An example of a structured light system as described above is the Seampilot Optical Profile Sensor System manufactured by Oldelft Corporation of America. Besides employing triangulation techniques, the Seampilot system compares camera readings of the monitored light reflected with programmed templates or predetermined patterns of reflections stored in a computer, whereby corrections are made in the positioning of the welding device to compensate for camera readings which are inconsistent with the stored template patterns. Therefore, the Seampilot system causes adjustment of welding device position only in response to comparisons with predetermined template patterns (sometimes referred to as a closed loop design). As such, in addition to the other deficiencies of this system as described above, the accuracy of this system is limited to the accuracy of the programmed template or templates available for comparison, and adaptation of the system to new applications is inherently cumbersome.

Another system which has been considered in the industry includes a visual system which is coaxial with the welding zone, as described in an article by R. W. Richardson, D. A. Gutow, R. A. Anderson and D. F. Fausen entitled "Coaxial Arc Weld Pool Viewing For Process Monitoring Control." (Welding Journal, March 1984, pp. 43–50). Specifically, the imaging system of this design has been integrated into the welding torch device itself. This configuration is thereby different from an imaging system external to the welding torch, which is generally mounted separately from and oriented at an oblique angle relative to the welding torch axis. However, as with all vision systems of the prior art, the imaging and monitoring capabilities of this coaxial system are impaired by the inability to control smoke, spatter and other welding debris inherently present immediately adjacent the welding zone.

DISCLOSURE OF THE INVENTION

It is an object of the present invention to provide an apparatus for aligning a welding device along the center of a gap defined by confronting edges of at least two workpieces to be joined, the apparatus using a visual imaging system which overcomes the problems in vision systems and alignment devices heretofore available in the industry.

It is another object of the present invention to provide an apparatus for aligning a welding device along the center of a gap defined by confronting edges of at least two workpieces to be joined which enables high speed welding so that weld costs per part can be minimized.

It is yet another object of the present invention to adjust the welding device and/or the workpieces in a translational sense to maintain alignment of the welding device along the center of a gap defined by the confronting edges of the workpieces.

It is also an object of the present invention to provide an apparatus for aligning a welding device along the center of a gap defined by confronting edges of at least two workpieces to be joined which is simple, reliable, inexpensive, and efficient.

In accordance with one aspect of the present invention, there is provided an apparatus for aligning a welding device along the center of a gap defined by confronting edges of at least two workpieces to be joined, wherein relative motion between the welding device and the workpiece gap occurs along a longitudinal axis substantially parallel to the gap such that the proximal edges of the workpieces can be joined along the gap during the relative motion by forming a weld seam. The apparatus preferably includes an imaging system for determining the location of the gap center relative to a predetermined two dimensional coordinate system by monitoring an image of a vision area along the gap downstream of the welding zone. This image is then transformed into an output signal which interacts with a feedback control system to cause translational adjustments in the positioning of the welding device and/or the workpiece gap so that the welding device and the gap center are properly aligned at all times. Further, the imaging system is effectively isolated from the welding zone through use of a high magnification optics system, a shroud structure, an independent light source, and a stream of inert gas supplied to the welding zone in the form of a vectored jet to divert smoke, spatter and other welding debris from the vision area and eliminate glare caused by the welding plume during welding.

BRIEF DESCRIPTION OF THE DRAWINGS

While the specification concludes with claims particularly pointing out and distinctly claiming the present invention, it is believed that the same will be better understood from the following description taken in conjunction with the accompanying drawing in which:

FIG. 2 is a perspective view of a preferred embodiment of the automatic alignment device of FIG. 1, illustrated in conjunction with a laser welding arrangement;

FIG. 3 is a partial rear view of the gantry depicted in FIG. 2, wherein the back cover of the gantry, the vision system, and the laser focusing optics have been removed for clarity;

FIG. 4 is a cross-sectional view of FIG. 3 taken along line 4—4;

FIG. 8 is a block diagram of the control system for the automatic alignment device of the present invention; and FIG. 9 is a partial perspective view of the automatic alignment device wherein the gap between the workpieces is back lighted. cl DETAILED DESCRIPTION OF THE INVENTION The alignment apparatus of the present invention will be explained in conjunction with a laser welding application, although it may be utilized with any type of other suitable welding device (such as conventional seam welding equipment, butt welding equipment, arc welding apparatus, or electron beam or plasma arc welding devices) which has the function of joining confronting edges of at least two workpieces.

Referring now to the drawings in detail, wherein like numerals indicate the same elements throughout the figures, FIG. 1 illustrates a schematic, simplified presentation of an alignment device 10 made in accordance with the present invention, as used in a laser welding application. FIG. 2 illustrates additional details of a preferred arrangement of alignment device 10 in conjunction with such laser welding equipment. As depicted in FIG. 2, alignment device 10 preferably comprises a work table 15 having a gantry structure 18 disposed thereover. Gantry 18 is depicted as comprising a hollow cross member 22, as well as a mechanical carriage 23 movably disposed along cross member 22 by means of a ball screw arrangement (see FIGS. 3 and 4).

Figure 1:
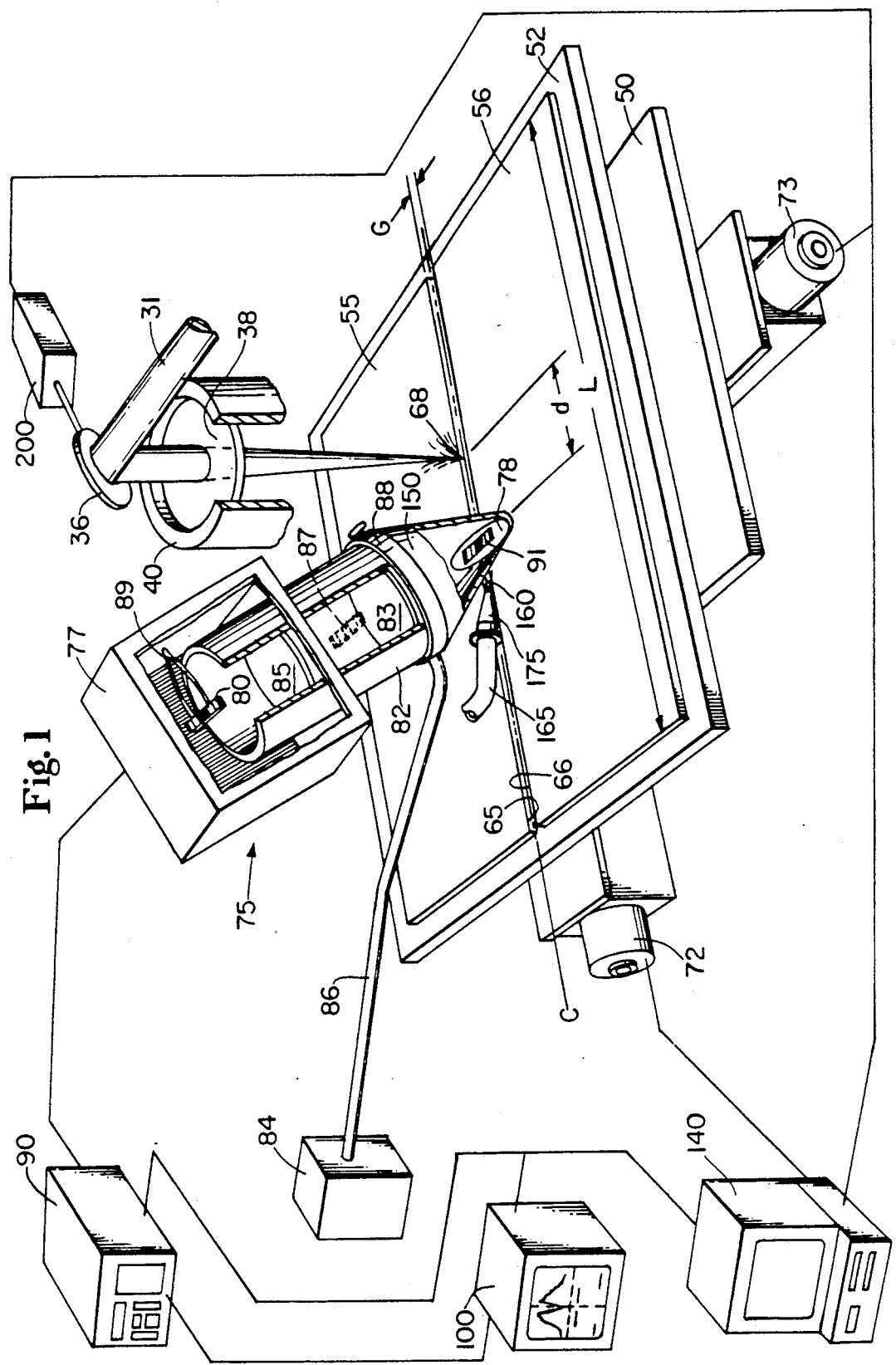
FIG. 1 is a partially broken out, simplified schematic view of the automatic alignment device depicted in conjunction with a laser welding device.

Specifically, mechanical carriage 23 is guided along cross member 22 by means of grips 24 on tracks 25. A motor 26 drives a ball screw 27 having threads which engage reverse threads on mechanical carriage 23 and causes mechanical carriage 23 to move linearly as ball screw 27 rotates. It will be noted in FIG. 3 that reflecting mirror 36 is positioned atop mechanical carriage 23 in order to maintain alignment with reflecting mirror 29 at all times irrespective of movement by mechanical carriage 23. Of course, any similar carriage/support rail arrangement may be used in conjunction with carriage 23. As will be seen, gantry 18 and movable carriage 23 may be provided to enable transverse movement of a welding or cutting device across table 15, but is not critical.

A laser 30 (e.g., a laser model EFA 53 as available from Coherent General, which is a 2.5 kilowatt fast axial flow carbon dioxide laser) preferably provides a high power beam 31 to reflecting mirror 28, which is oriented so as to cause high power beam 31 to be reflected upward to a second reflecting mirror 29 and then sideways into the hollow portion of cross member 22. For safety reasons, conduit 33 can be provided between reflecting mirror 29 and cross member 22 to enclose beam 31.

A laser focusing mechanism including optics (shown generally at 35) is provided in conjunction with mechanical carriage 23 and aligned with a third reflecting mirror 36 which is positioned to receive high power beam 31 and redirect it toward a weld zone therebelow. An exemplary integral system for laser focusing mechanism 35 is available under the model name Accucutter System from Laser Mechanics, Inc. of Southfield, Mich. More specifically, laser focusing mechanism 35 includes a focusing lens 38 through which high power laser beam 31 is directed downward toward work table 15. As seen best in FIG. 1, focusing lens 38 is retained by lens mount 40, at least a portion of lens mount 40 preferably being water cooled to prevent overheating of focusing lens 38 in use. Any number of different lenses having differing diameters and focal lengths can be utilized as appropriate to produce good quality laser welds and/or cuts. Focusing lenses having focal lengths of ten inches (254 mm) and five inches (127 mm) have been used successfully in tests of the present invention.

Alternatively, it will be understood by those skilled in the art that an off-axis parabolic mirror reflector unit can be substituted for laser focusing mechanism 35. Such a reflector unit (e.g., the Model 486-1000-X Mirror Focus Unit from Rofin Sinar, Inc. of Plymouth, Mich.) may be utilized to focus high power laser beam 31 toward the weld zone.

It should be noted that while the present invention is shown and described as an alignment device for welding applications, it can be adapted for laser cutting in applications where a cut path is premarked on a workpiece. It is well known that laser cutting and laser welding can be accomplished by a single laser device by simply adjusting the assist gas and pressures as appropriate. Moreover, the present invention is equally adaptable to all kinds of welding applications and is not intended to be limited to laser apparatuses.

Figure 5:
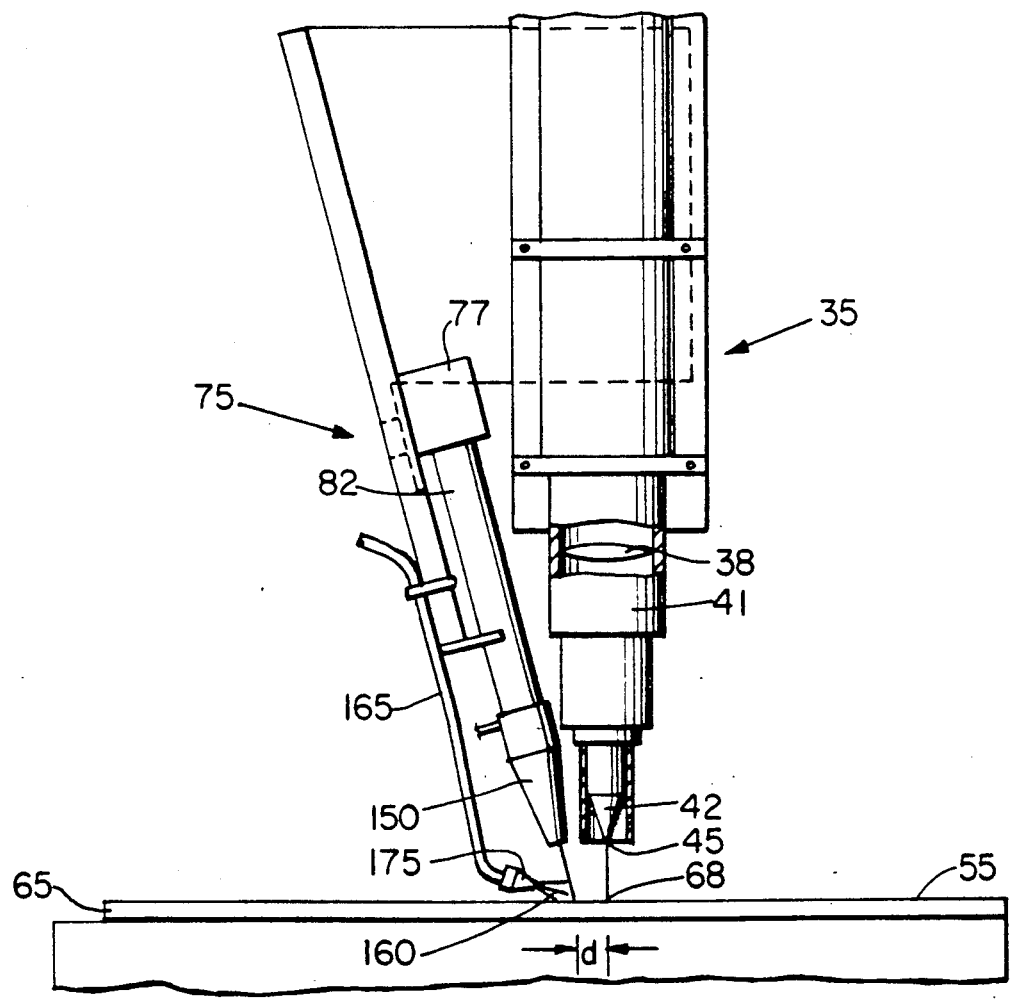
FIG. 5 is a partial side view of the automatic alignment device as depicted in FIG. 2.

As seen in FIG. 5, laser focusing mechanism 35 preferably includes a focusing lens housing 41 having means (e.g., threads) for attaching a coaxial nozzle 42 on the lowermost portion thereof. Focusing lens housing 41 and/or nozzle 42 may also include a port (not shown) therein for introducing assist gas as desired. A delivery tip 45 may also be provided at the distal end of nozzle 42 to more accurately control and concentrate application of the assist gas to the weld/cut zone. Delivery tip 45 may be especially desired for welding thin gauge material (e.g., less than 2.5 millimeters thick) when an inert gas (e.g., helium, argon, etc.) is provided and a relatively low tip pressure is set.

Referring again to FIGS 1 and 2, work table 15 preferably includes a first translation table 50 movably mounted thereon for reciprocating movement along a transverse axis (e.g., y axis as indicated by the arrow) in FIG. 1. A second translation table 52 preferably surmounts first translation table 50 to provide reciprocal movement in a longitudinal direction (e.g., along longitudinal axis x) perpendicular to transverse axis y. These translation tables and their movement will be discussed in greater detail below.

First and second workpieces 55 and 56 are illustrated in FIG. 2 as being supported in substantially planar relationship by an electromagnetic hold-down device 60 and auxiliary hold-down magnets 62, as described in the co-pending application entitled, "Method And Apparatus for Automatically Aligning Proximal Edges of Sheets To Be Butt Welded," filed on even date herewith in the name of Gary L. Neiheisel, et al. Stops 63 are provided to preliminarily align workpieces 55 and 56, wherein workpiece 56 is first placed on electromagnetic hold-down device 60 and auxiliary hold-down magnets 62 so that it is abutted against stops 63. Thereafter, workpiece 55 is placed on auxiliary hold-down magnets 62 so that confronting edges 65 and 66 of workpieces 55 and 56 are substantially abutting above electromagnetic hold-down device 60. Electromagnetic hold-down device 60 is then activated to further bring confronting edges 65 and 66 in abutment and magnetically hold workpieces 55 and 56 in such position.

Electromagnetic hold-down device 60, auxiliary hold-down magnets 62, and stops 63 are preferably fixedly attached adjacent the upper surface of second translation table 52 such that the position of supported workpieces 55 and 56 can be corrected by movement of either table 50 or table 52. It should be noted that while such magnetic hold-downs are preferred to minimize interfering parts commonly associated with mechanical clamps and the like, any means for holding the workpieces in abutted relationship can be substituted.

As best shown in FIG. 1, workpieces 55 and 56 are positioned to be in substantially planar relationship whereby a gap G is formed between confronting edges 65 and 66 of workpieces 55 and 56 respectively. Adjacent workpieces need not be in substantially planar orientation for application of the subject invention (e.g., welding of workpieces positioned normal to each other or being configured to form a non-planar object such as a cylinder), however most laser welding and cutting operations are commonly performed on edges of workpieces maintained in positions substantially planar and normal to the laser beam. It should also be understood that while gap G may be substantially uniform along its longitudinal length L, confronting edges 65 and 66 will likely have some irregularities, such as slight bowing or the like, especially when workpieces 55 and 56 are trimmed by conventional shearing techniques.

As described hereinabove, beam 31 is directed through focusing lens 38 coaxially through nozzle 42 and delivery tip 45. Accordingly, workpieces 55 and 56 must be positioned such that the center C of gap G is aligned with the point of impingement of high power beam 31. This point of impingement shall be referred to as the welding point and is identified as 68 in FIG. 1. While center C is illustrated as a line for simplicity, it should be understood that the center point of gap G will shift transversely along longitudinal length L due to local irregularities. The center points of gap G along length L form center line C. Since the weld will generally be accomplished at more than a single point, the welding point may more correctly be referred to as the welding zone or area, and will be so designated interchangeably herein.

Initially, alignment of center line C with the motion of translation table 52 in the x direction is accomplished by pulsing high power beam 31 at the beginning and end of gap G during set-up, comparing the imaginary straight line extending between the beginning and end points with the direction of motion for translation table 52, and compensating for any misalignment therebetween. Such compensations are made by adjusting translation table 50 in the y direction. preferably, compensations for misalignment can be accomplished automatically by a programmable controller that energizes motors 72 and 73 as appropriate to implement corrections once the coordinates of the end pulses have been specified to a computer (discussed hereinafter) with respect to the weld seam.

In order to form an optimum weld seam along the length L of gap G between workpieces 55 and 56, relative motion is provided between welding point or zone 68 and workpieces 55 and 56 along a longitudinal axis substantially parallel to center line C, gap G and axis x. While such relative motion may be provided by moving beam 31 and welding point 68 along center line C, such would involve the delicate rotation of reflecting mirror 36 or translation of gantry 18 along work table 15, neither of which is preferred. Providing movability of beam 31 in the x direction injects unnecessary complexity and expense into the alignment device 10, and may compromise reliability as well. In particular, beam 31 would have to be maintained within the clear useable aperture of lens 38 during any rotation of mirror 36, lens 38 being held in a fixed position. Otherwise, if beam 31 is moved too far from the center of lens 38 in order to shift the weld zone therebelow, aberrations will be introduced into beam 31 causing its point of impingement to be larger in size. This in turn will cause a reduction in the power density of beam 31 at weld zone 68 and may result in incomplete welding of workpieces 55 and 56.

In a preferred embodiment, second translation table 52 is moved longitudinally such that workpieces 55 and 56 are advanced below welding point 68 in a direction substantially parallel to the longitudinal axis of center line C and gap G. It should be noted that high speeds of welding (i.e., relative motion between gap G and laser focusing mechanism 35) are desired, as well as uniform weld seams. The aligning device of the present invention provides both by continuously maintaining alignment between welding point 68 and the center line C of gap G, while operating at up to 15 meters per minute in both the x and y directions. Of course, higher weld speeds are possible if higher laser power is used or thinner gauge material is welded. However, accurate and reliable motion systems for speeds higher than 15 meters per minute can become prohibitively expensive and difficult to obtain. Motors 72 and 73 (e.g., stepper motors) are utilized to provide movement to second and first translation tables 52 and 50 respectively, and, in turn, to workpieces 55 and 56, along the length L of gap G.

A visual imaging system (shown generally at 75 in FIG. 2) is provided to locate center line C of gap G. As shown in FIG. 1, visual imaging system 75 comprises a line scan camera 77 (such as available from EG&G Reticon of Sunnyvale, Calif.), e.g., having 2048 elements and 13 micron spacing between adjacent elements in its array) as a preferred means for receiving the reflected light levels in a defined vision area 78, whereby an image of gap G is formed on a linear array 80 of individual elements or pixels within camera 77.

While the general use of line scan cameras in vision systems for welding applications is not unique in and of itself, heretofore such systems have been positioned in close proximity to the welding point, thereby causing inaccurate viewing due to the hostile environment adjacent a weld zone, such as smoke, spatter, welding debris, and glare from the weld plume. The visual system 75 of the present invention utilizes a high magnification optical system 82 (such as available from Titan Tool Supply Company, Inc., of Buffalo, N.Y., e.g., having a zoom objective with an "effective" two lens system which performs in the same manner as a long working-distance microscope) in conjunction with line scan camera 77. Specifically, high magnification optical system 82 includes an objective lens 83 and an eyepiece lens 85. As shown in FIG. 1, the weld seam (which includes gap G and some portion of workpieces 55 and 56) in vision area 78 is the object of objective lens 83, and a real image 87 of the weld seam is provided between objective lens 83 and eyepiece lens 85. This real image is the object of eyepiece lens 85, and a real image is then received by linear array 80 and analyzed by sensor circuit 89 of line scan camera 77. For purposes of clarity, an image 91 of the linear array for the weld seam is back projected into vision area 78. It should be understood that, as practiced in the prior art, a plurality of independent lenses may be combined to function as objective lens 83 and eyepiece lens 85. In any event, as noted above, this system will operate as an "effective" two-lens long working-distance microscope system.

The high magnification optics system 82, as well as the angling of vision system 75 relative to workpieces 55 and 56 and laser focusing optics 35, help to locate vision area 78 nearer welding zone 68 without physical interference between vision system 75 and laser focusing mechanism 35. Simultaneously, a greater standoff distance (or distance from welding zone 68) for line scan camera 77 is enabled through use of high magnification optics system 82.

Additionally, rather than rely upon light from the weld plume of high power laser beam 31 to illuminate the vision area, an independent light source 84 is preferably provided. Light source 84 supplies light for visual imaging system 75. In a preferred embodiment, light source 84 provides light to view gap G with high magnification optical system 82 by means of a coherent fiber optics bundle 86 and a fiber optic ring illuminator 88 mounted around the lowermost end of high magnification optics system 82. This arrangement enables consistent and substantially uniform illumination to be provided coaxially onto vision area 78, simultaneously facilitating a clear view of the reflection of such uniform light within vision area 78 by line scan camera 77. By ensuring a predictable and uniform application of coaxial light to vision area 78, and by providing a substantially unimpeded view of such vision area by line scan camera 77, a more accurate and reliable image from the diffusely scattered light can be formed and monitored.

It will be understood that light source 84 could be a laser of a specified monochromatic wavelength (e.g., a helium neon laser having a wavelength of 6328 Angstroms). Visual imaging system 75 could then be fitted with a narrow band filter which is tuned at the illuminating laser wavelength, as is known by those skilled in the art. In this way, only the desired illuminating wavelength of light would be focused on array 80, which would reduce any inteference from external light (such as emission from the weld plume).

Alternatively, a light source 95 may be positioned so as to back light vision area 78, such as from below workpieces 55 and 56 and through gap G (see FIG. 9). As seen in FIG. 9, light source 95 is a fluorescent bulb contained within electromagnetic hold down device 60 which has a coating 96 that allows illumination only from area 97 thereof. Area 97 has an aperture width 98 which allows illumination to be provided upward therefrom between auxiliary hold down magnets 62 and toward gap G between workpieces 55 and 56. It is preferred that light source 95 extend along the whole longitudinal length of gap G in this embodiment, but light source 95 could be of a lesser length and moved along gap G so long as it illuminates vision area 78 for line scan camera 77.

In some applications a back lighted arrangement might enable visual imaging system 75 to more accurately monitor vision area 78, such as when confronting edges 65 and 66 of workpieces 55 and 56 are somewhat rounded in top surface to bottom surface profile due to dull shearing blades. Rounded edges tend to scatter impinging light in such a way that the actual gap width is overestimated and thus the ability of any such device to distinguish and determine the actual topography of the gap between such workpieces is reduced. Back lighting ensures relatively high amounts of light are received directly through gap G by the viewing means such as line scan camera 77, enabling more clear delineation of the location of the proximal edges.

Once line scan camera 77 has formed an image on linear array 80 of the weld seam within vision area 78, it can provide a video signal to a controller 90 as shown in FIG. 1. Controller 90 can be any electronic device (such as the Videk Model 20) capable of receiving a video or vision signal from a camera or similar viewing means, and thereafter transforming that video signal into an output signal which can be used to determine the relative location and width w of gap G. In particular, controller 90 operates to transform the data from linear array 80 (i.e., the pixel location) of vision area 78 into an output voltage or digital data stream. As shown in the block diagram of FIG. 8, an oscilloscope 100 may be utilized to monitor the video signal by sampling it from controller 90 or directly from camera 77. Because the alignment device of the present invention is preferably fully automatic, the inclusion of an oscilloscope or similar output signal monitor is not required in the data acquisition or use procedures per se. Oscilloscope 100, however, is preferred as a diagnostic tool to simplify supervision of the system in operation. Particularly, as will be seen, proper monitoring through the use of an oscilloscope or similar data read-out device allows an operator to determine whether the alignment device is operating correctly.

Figure 6:
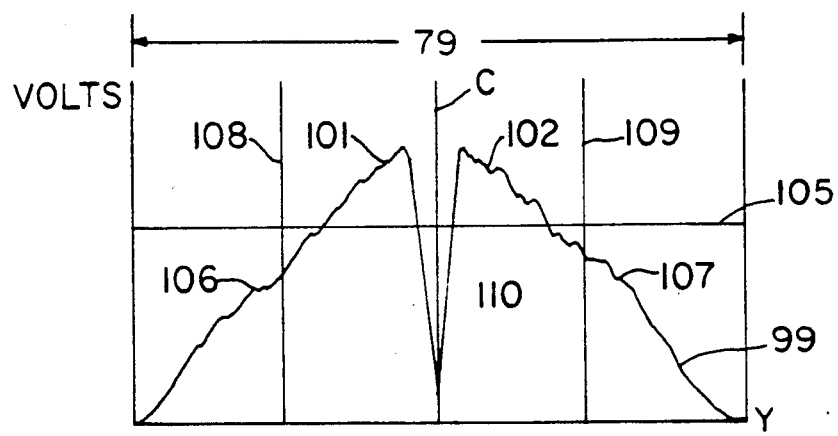
FIG. 6 is a graph depicting an exemplary output signal in analog form which might be received by the control system of an automatic alignment device of the present invention.

An example of a typical raw analog video signal 99 which might appear on oscilloscope 100 is depicted in FIG. 6. As illustrated, "peaks" (high levels of output voltage V) indicated at 101 and 102, respectively, signify the scattered light intensity reflected from workpieces 55 and 56 within vision area 78. Light is preferably concentrated within vision area 78 which is limited to a predetermined portion of workpieces 55 and 56 immediately adjacent their respective confronting edges 65 and 66.

In particular, a field of view or vision area of a strip approximately one-quarter inch (6 millimeters) has been found to work well to obtain approximately 0.0001–0.0002 inch (0.0025–0.005 millimeter) resolution (i.e., approximately 1 to 2 pixels) with the optics described herein. Line scan camera 77 can scan vision area 78 at rates as high as 1000 scans/second although it is contemplated that a scan rate of 30 scans/second will be used in production to allow use of a less intense and less expensive light source. The field of view and scan rate chosen for any particular application may vary, and would be based in part on the contemplated speed of operation desired, the overall quality of the butted proximal edges at gap G, resolution desired, line scan array requirements and capacities, reflectivity and scattering characteristics of the workpiece surfaces, light source intensity, etc.

By concentrating the illumination into a predetermined area, the effects of extraneous and incidental light from other sources is minimized. Moreover, line scan camera 77 has an adjustable field of active vision, based on where the most uniform illumination and gap G are located within the total field of vision 79 (see FIG. 6) of line scan camera 77. For example, the active field of vision for line scan camera 77 may preferably be only slightly larger than gap G itself (as exhibited by the bounds of "windowing" lines 108 and 109 in FIGS. 6 and 7). The pixels defined by "window" lines 108 and 109 define that region of array 80 that is active (and, hence, that region of the field of view that is active) from which data will be accepted for further processing. These active pixel limits or "window" lines 108 and 109 are set within controller 90.

Further, as illustrated in FIG. 6, dashed line 105 identifies a threshold voltage (corresponding to a minimum illumination below which the illumination level must fall) before corrections in the alignment of gap center line C and high power laser beam 31 are initiated. By way of example, when the level of reflected illumination from workpieces 55 and 56 is below threshold voltage 105 for the entire active region, it may indicate that light source 84 has burned out, is otherwise not providing the requisite level of light, or the field of view of line scan camera 77 may be off the end of the workpieces.

Figure 7:
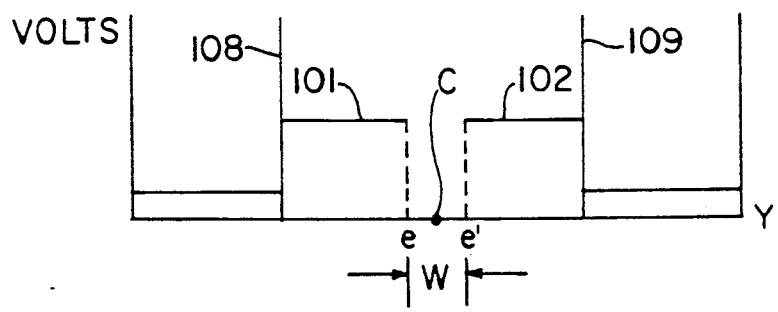
FIG. 7 is a graph depicting the exemplary output signal of FIG. 4 after conversion to digital form.

FIG. 7 is a graphical representation of the digital conversion or digital data stream provided by controller 90 from the raw analog video input. The representation is a result of comparing raw video signal 99 to threshold voltage 105 (of FIG. 6). The gap portion of video signal 99 and its relation to threshold 105 is monitored to determine alignment adjustments, if any, which are required. Both the raw analog video and the converted digital stream can be simultaneously displayed on oscilloscope 100.

As seen by area 110 in FIG. 6, the level of illumination viewed between workpieces 55 and 56 (as seen between areas 101 and 102) is extremely low, which evidences the presence of gap G therebetween. The scattered light level received by array 80 is low at gap G because gap G acts as a good absorber for the illumination that falls on it. The width w of area 110 determines the width of gap G so that center line C can be located. In particular, center line C of gap G is indicated by line C in FIG. 6 and point C in FIG. 7. Other levels of output voltage illustrate lower levels of reflected or other inevitable incidental outside light along the y axis, such as at points 106 and 107 of camera control signal 99 nearer the periphery of the vision area 78. By establishing a threshold voltage level 105, the system is able to distinguish between the concentrated light directed by fiber optic light illuminator 88 coaxially on vision area 78 and unimportant reflected light from workpieces 55 and 56 within the field of vision of line scan camera 77.

When an output voltage signal (such as illustrated in FIG. 7) from controller 90 is received indicating that the relative location of center line C (i.e., halfway between points e and e' in FIG. 7) of gap G has shifted from the last indicated location, the signal in field of view 79 of line scan camera 77 indicates mis-positioning of gap center line C. Controller 90 (which monitors area 110) sends a signal to a computer 140 (or alternatively a single interface board such as the Model DAS-16 and DAS-16F interfaces manufactured by MetraByte Corporation of Taunton, Mass.), which then activates y drive board 142 to send a signal to motor 73 for shifting first translation table 50 and/or mechanical carriage 23 proportional to the shift of gap G for correction, thereby maintaining alignment of center line C with high power laser beam 31. Such correction of the relative location of center line C can be accomplished during relative motion between alignment device 10 and gap G, during welding or cutting as a result of a changing location or shape of gap G (which may result where the proximal edges have been cut by conventional raked shearing or other inferior cutting techniques), or skewing of the butted seam line between workpieces 55 and 56 along its longitudinal length L.

In the preferred embodiments of the present invention, computer 140 includes an x drive board 141 for producing motion by translation table 52 along the x axis and a y drive board 142 which ultimately receives the signal from camera controller 90 to adjust first translation table 50 in the y direction (see FIGS. 1 and 2). Since the translation axes of first and second translation tables 50 and 52 are preferably oriented normal to one another in an x-y coordinate configuration, movement of translation table 50 directly causes changes in the position of workpieces 55 and 56, and consequently, the center line C of gap G, perpendicular to the longitudinal axis of gap G. As gap G of workpieces 55 and 56 and welding point 68 are moved relative one another to accomplish welding along gap G, translation tables 50 and 52 can be automatically and continuously adjusted to optically align relative positions of welding point 68 and gap center line C in response to commands from computer 140 and y drive board 142. Accordingly, alignment apparatus 10 is an active device, meaning that visual imaging system 75 is not preprogrammed to compare signals with programmed templates or the like. Rather, it is a live system which reacts to each application in a manner akin to artificial intelligence.

Computer 140 (such as the Model VB2100 Interface Board by Girard Electronics and an IBM PC AT) is also preferably programmed to compensate for inherent delays in initiating or terminating high power laser beam 31, or initially focusing line scan camera 77 directly along gap G. Because high magnification optical system 82 is preferably positioned at an oblique angle to welding point 68, and vision area 78 is spaced longitudinally downstream along center line C from welding point 68, compensation for this actual spacing and inherent time delays between correction required at a particular point and relative movement between the welding device and gap G must also be addressed by appropriate algorithms in computer 140.

One algorithm utilized in the present invention involves calculating changes in speed along the y-axis, i.e., perpendicular to the longitudinal axis of gap G. This speed or rate algorithm involves continuously sampling the position of vision area 78 along a line of vision 79 (see FIG. 5) in conjunction with welding area 68 during relative motion between workpieces 55 and 56 and welding point 68.

After field of vision 78 and welding point 68 have been centered on gap G, vision system 75 and laser focusing optics 35 are positioned with respect to workpieces 55 and 56 such that vision area 78 is at the longitudinal starting point along the length of gap G (if a high welding rate is required, whereby acceleration of workpieces 55 and 56 cannot reach the required speed in distance d, vision system 75 and laser focusing optics 35 may be positioned with respect to workpieces 55 and 56 for a running start at gap G). Once the beginning of gap G reaches welding zone 68, welding begins and the speed of workpieces 55 and 56 via translation table 50 along the y axis is calculated as:

$$V_y = (\Delta y)(V_x/d),$$

where $\Delta y$ is the change in position along the y axis between the initial centered point and when next viewed by vision system 75. $V_x$ is the speed of workpieces 55 and 56 along the x axis toward welding point 68 and d is the distance between vision area 78 and welding point 68 (as seen best in FIG. 5). It is contemplated that computer 140 will have the values of $V_x$ and d preprogrammed therein. Thereafter, as the speed of workpieces 55 and 56 changes along the y axis, changes in speed will be calculated as:

$$V_y \text{ (new)} = V_y \text{ (current)} + \frac{\Delta y(\text{new}) - \Delta y(\text{old})}{\Delta t},$$

$$\text{where } \Delta t = \frac{x \text{ (new)} - x \text{ (old)}}{V_x}.$$

This algorithm thus enables proper calculation of speed along the y axis for workpieces 55 and 56, which is particularly important for assuring that workpieces 55 and 56 are adjusted at the proper time so that welding zone 68 is aligned with center line C at all times. Laser focusing optics 35 (i.e., the location of beam 31 itself) may alternatively be adjusted by mechanical carriage 23 to maintain such alignment, either as an alternative or in addition to alignment adjustment by translation tables 50 and 52. It has been found that vision area 78 can conveniently be located within approximately 1.25 inches (about 31.75 mm) of welding point 68. While it is generally preferred to locate vision area 78 as close to welding zone 68 as possible to optimize accuracy of corrections, it must be remembered that the closer vision area 78 is to welding zone 68, the more likely it is that weld smoke, spatter and extraneous light will interfere with a clear view by vision system 75.

Additionally, alignment device 10 preferably includes a latching arrangement for maintaining a constant rate of change (or adjustment vector) for workpieces 55 and 56 perpendicular to gap center line C to interpolate continuing alignment at the end of the weld once the spaced vision area 78 passes the distal end of gap G. For example, one latching arrangement involves an algorithm in computer 140 to maintain the most recent adjustment parameters for gap G in this area.

Rather than utilize first translation table 50 for providing relative motion perpendicular to the longitudinal axis of gap G (i.e., along the y axis), mechanical carriage 23 may be moved to thereby adjust focusing lens 38 attached to laser focusing mechanism 35. It should also be understood that vision system 75 is also connected to mechanical carriage 23 (as depicted in FIG. 2) so that it undergoes the same movement as laser focusing mechanism 35 as appropriate. In this embodiment, camera controller 90 sends a signal to computer 140 which then sends a signal to y drive board 142 to adjust mechanical carriage 23 accordingly. It should be noted that movement of high power laser beam 31, while common in the prior art, is not preferred because it can cause problems with alignment of high power laser beam 31 with the aperture of focusing lens 38, and may add to the cost and complexity of the overall system. A mirror servo or piezo-electric motor 200 may be provided (as seen in FIG. 1), however, to make slight adjustments in the orientation of reflecting mirror 36 to maintain proper alignment of high power beam 31 with focusing lens 38.

Another embodiment of an alignment device made in accordance herewith may implement alignment corrections through a combination of both laser focusing mechanism 35 and translation table 50, wherein part of the compensation for mis-positioning of gap center line C and welding point 68 might be accomplished by moving mechanical carriage 23 to adjust laser focusing mechanism 35 and welding point 68, and the balance of any required compensation might be completed by moving translation table 50 to adjust gap center line C. This arrangement would require two y drive boards inside computer 140 responsive to signals from computer 140.

A shroud 150 is also preferably connected to the lowermost end of high magnification optical system 82 closest to vision area 78 in order to further concentrate the illumination of vision area 78. Shroud 150 also serves to provide a protective function for optics system 82, as it substantially isolates the optic elements from welding debris and the like. Shroud 150 can be generally frusto-conical in shape and may be connected to optics system 82 by means of a ring clamp or similar means. It is presumed that any of a number of materials may be utilized for shroud 150, with polished aluminum, or any material with a thin layer of highly reflective material such as aluminum foil, being preferred to augment the concentration of light at the vision area 78.

As mentioned earlier, it is preferred to locate the vision area of an alignment system as close as possible to the welding zone to obtain the most accurate instantaneous alignment of a welding device on the center line of the gap between two or more workpieces to be welded. On the other hand, close proximity to a welding zone subjects a highly sensitive and generally expensive optic arrangement to the hostile environment of the welding procedure. Heretofore it has been common practice to determine the location of the viewing area at a safe distance from the welding zone, offsetting reduced accuracy by increased safety/protection for the optics. The unique structure of the present alignment device, however, enables minimum spacing between vision area 78 and welding zone 68, with optimal safety and protection characteristics.

Particularly, in order to effectively space vision area 78 at a "safe" distance from welding zone 68, a jet 160 of inert gas is most effectively provided adjacent welding zone or point 68 substantially parallel to the center line C and in a direction generally away from vision area 78. Also, it is preferred that jet 160 of inert gas be applied in a direction substantially normal to the application of welding energy (e.g., normal to the laser beam or plasma arc). The exact placement and direction of one or more nozzles providing jet 160 is not critical, however, so long as the resultant vector of jet 160 is through the welding zone and away from vision area 78 and substantially intersects with the direction of impingement by beam 31 at the welding zone 68. Jet 160 thereby diverts the weld plume, smoke, spatter and other welding debris away from vision area 78 for more accurate viewing by line scan camera 77. In so doing, jet 160 provides the protection of effectively spacing vision area 78 further from welding zone 68 without requiring actual physical distance therebetween.

As best depicted in FIG. 1, a gas supply line 165 provides regulated, pressurized inert gas from an inert gas source (not shown). To further improve application of the inert gas from supply line 165 so that the inert gas is a vectored jet, a nozzle 175 is provided at the outlet of supply line 165, preferably at a position spaced somewhat from weld zone 68 and vision area 78. Preferably, supply line 165 is connected to high magnification optics 82 so that nozzle 175 is positioned adjacent to gap G as seen in FIG. 2. Examples of inert gasses which have been utilized with success in this application include helium and argon.

It is also preferred that jet 160 be provided so as to pass directly over vision area 78 generally along gap G as it is directed toward welding point 68 in order to simultaneously ensure that vision area 78 will be relatively free of dust or other extraneous matter which might compromise an optimum view of gap G. The vectored application of inert gas not only blows smoke and other welding debris away from high magnification optical system 82 so as to improve visibility of vision area 78, but also eliminates the glare into line scan camera 77 by reducing the weld plume at welding point 68 (helium is particularly effective at reducing the weld plume).

A principal benefit of this application of inert gas on welding point 68 is also to minimize a need for expensive and complicated filters often required with visual imaging systems to eliminate spurious radiation from welding. Application of inert gas in this manner may also eliminate a need to provide a cover gas for the welding device. While jet 160 is shown as being supplied by a single source and single nozzle arrangement situated downstream of shroud 150, it should be understood that any number of jet streams and/or nozzles could equally be employed to achieve the effective spacing of vision area 78 from welding zone 68 such that the weld plume, smoke and other debris is directed away from vision area 78.

Having shown and described the preferred embodiments of the present invention, further adaptations of the apparatus for aligning a welding point and the center of a gap between two workpieces can be accomplished by appropriate modifications by one of ordinary skill in the art without departing from the scope of the present invention. Several potential modifications have been mentioned, and others will be apparent to those skilled in the art. Accordingly, the scope of the present invention should be considered in terms of the following claims of structure and operation shown and described in the specification and drawings.

What is claimed is:

1. An apparatus for automatically and continuously aligning a welding device along approximately the center of a continuous gap defined by confronting proximal edges of at least two workpieces to be joined, wherein relative motion between said welding device and said workpieces along a longitudinal axis substantially parallel to said gap permits joining of said confronting edges of said workpieces by said welding device by application of welding energy at a welding zone along said edges, said aligning apparatus comprising:
   (a) an imaging system for determining the location of said gap center relative to a predetermined two dimensional coordinate system, wherein an image of a vision area spaced downstream of said welding zone along said longitudinal axis is produced, said vision area designed to span said gap and include said confronting edges of said workpieces;
   (b) means for receiving and transforming said image of said vision area into an output signal defining the location of said gap center relative to said welding device;
   (c) means for automatically adjusting the relative positions of said welding device and said center of said gap in response to said output signal such that said welding device and said center are continuously aligned at all times; and
   (d) means for effectively isolating said vision area from said welding zone, said isolating means including a jet of inert gas provided adjacent said welding zone to divert weld plume, smoke, spatter and other welding debris from said vision area.

2. The apparatus of claim 1, further comprising an independent source of illumination which transmits light to said vision area by means of a coherent fiber optics bundle.

3. The apparatus of claim 2, wherein illumination of said vision area is provided coaxially with said imaging system.

4. The apparatus of claim 1, wherein said adjusting means further comprises a translation table for supporting said workpieces, said translation table being movable substantially perpendicular to said longitudinal axis in response to control signals derived from said output signal, wherein movement of said translation table results in adjustment of said gap center in a direction substantially perpendicular to said longitudinal axis.

5. The apparatus of claim 1, further including means for directing a laser beam of said welding device to said welding zone, said directing means comprising at least one reflecting mirror which reflects said laser beam through laser focusing optics to said zone.

6. The apparatus of claim 5, said adjusting means comprising means for moving said at least one reflecting mirror, wherein said laser beam is movable substantially perpendicular to said longitudinal axis in response to control signals derived from said output signal.

7. The apparatus of claim 5, said adjusting means comprising:
   (a) a gantry structure having a cross member;
   (b) a mechanical carriage connected to said cross member and linearally movable thereacross, said directing means and said vision system being attached to said mechanical carriage;
   (c) means for moving said mechanical carriage across said cross member;
   (d) means for providing a control signal to move said mechanical carriage in response to said output signal, wherein adjustment of said laser beam normal to said longitudinal axis occurs to maintain alignment with said gap center.

8. An apparatus for automatically and continuously aligning a laser beam along approximately the center of a continuous gap defined by confronting proximal edges of at least two workpieces, wherein relative motion between said laser beam and said workpieces occurs along a longitudinal axis substantially parallel to said gap to permit welding or cutting of said workpieces by said laser beam, said aligning apparatus comprising:
   (a) a vision system for determining the location of said center relative to a predetermined two dimensional coordinate system, said vision system further comprising:
      (1) a line scan camera for producing an image of a vision area spaced downstream of said laser beam along said longitudinal axis, said vision area designed to span said gap and to include said confronting edges of said workpieces;
      (2) an optics system operably attached to said line scan camera, wherein said line scan camera may be substantially spaced from said vision area while maintaining the reception of said vision area;
      (3) a fiber optic ring illuminator connected to the lowermost portion of said optics system; and
      (4) an independent source of illumination connected to said fiber optic illuminator by means of a coherent fiber optics bundle, wherein illumination is supplied to said vision area coaxial to said optics system;

(b) means for receiving said image and transforming it into an output signal defining the location of said gap center relative to said laser beam;

(c) a first translation table movable parallel to said longitudinal axis for providing said relative motion between said laser beam and said workpieces, said workpieces being fixtured to said first translation table so that said workpieces move in accordance therewith;

(d) means for automatically adjusting the relative locations of said laser beam and said gap center in response to said output signal such that said laser beam and said gap center are continuously maintained in alignment.

9. The apparatus of claim 8, wherein said adjusting means further comprises a second translation table being movable substantially perpendicular to said longitudinal axis in response to control signals derived from said output signal, said second translation table being movable in conjunction with said first translation table, said workpieces being fixtured to said translation tables so that said workpieces move in accordance with said first and second translation tables.

10. The apparatus of claim 8, wherein said receiving means has an adjustable field of view to selectively transform only a predetermined portion of said image into an output signal.

11. The apparatus of claim 8, further including means for directing said laser beam to a defined zone along said longitudinal axis, said directing means comprising at least one reflecting mirror which reflects said laser beam through laser focusing optics to said zone.

12. The apparatus of claim 11, further including:
(a) a gantry structure having a cross member;
(b) a mechanical carriage connected to said cross member and linearly movable thereacross, said directing means and said vision system being attached to said mechanical carriage;
(c) means for moving said mechanical carriage across said cross member;
(d) means for providing a control signal to move said mechanical carriage in response to said output signal, wherein adjustment of said laser beam normal to said longitudinal axis occurs to maintain alignment with said gap center.

13. The apparatus of claim 8, including a means for monitoring said output signal.

14. The apparatus of claim 8, wherein said adjusting means is not responsive to an output signal below a predetermined threshold level.

15. The apparatus of claim 1, including a source of illumination which illuminates said gap from below said workpieces.

16. The apparatus of claim 8, wherein said workpieces are substantially planar.

17. The apparatus of claim 8, said adjusting means including a computer for automatically adjusting the velocity of said first translation table adjustments.

18. A method of automatically and continuously aligning a welding device along approximately the center of a continuous gap defined by confronting proximal edges of at least two workpieces to be joined, wherein relative motion between said welding device and said workpieces along a longitudinal axis substantially parallel to said gap permits joining of said confronting edges of said workpieces by said welding device, said method including the steps of:

(a) providing a vision system for determining the location of said center of said gap along said longitudinal axis during said relative motion, said vision system monitoring said gap within a vision area spaced downstream of said welding device along said longitudinal axis;

(b) automatically adjusting the relative positions of said welding device and said center of said gap such that said welding device and said gap center are maintained in alignment;

(c) providing a jet of inert gas adjacent the zone where said welding device applies welding energy along said gap during joining procedures, said jet being effectively oriented such that its resultant vector is through said zone and away from said vision area.

19. The method of claim 18, further including the step of providing illumination to said vision area.

20. The method of claim 18, further comprising the step of maintaining a constant rate of adjustment of the relative positions of said welding device and said gap center at the end of said gap once said vision area passes the distal end of said gap, said constant rate being determined by a controller for maintaining alignment once said vision area passes the end of said gap.

21. The method of claim 18, further including the step of initially aligning said gap center with the direction of relative motion between said welding device and said workpieces.

22. The method of claim 21, wherein said initial alignment step includes:
(a) pulsing said welding device at a plurality of predetermined points along the longitudinal axis of said gap;
(b) locating a line connecting said points;
(c) comparing said line with the current direction of relative motion; and
(d) compensating for any misalignment between said line and the current direction of relative motion.

23. An apparatus for automatically and continuously aligning a welding device along approximately the center of a continuous gap defined by confronting proximal edges of at least two workpieces to be joined, wherein relative motion between said welding device and said workpieces along a longitudinal axis substantially parallel to said gap permits joining of said confronting edges of said workpieces by said welding deice by application of welding energy at a welding zone along said edges, said aligning apparatus comprising:

(a) an imaging system for determining the location of said gap center relative to a predetermined two dimensional coordinate system, wherein an image of a vision area spaced downstream of said welding zone along said longitudinal axis is produced, said vision area designed to span said gap and include said confronting edges of said workpieces;

(b) means for receiving and transforming said image of said vision area into an output signal defining the location of said gap center relative to said welding device;

(c) means for automatically adjusting the relative positions of said welding device and said center of said gap in response to said output signal such that said welding device and said center are continuously aligned to all times; and (d) means for effectively isolating said vision area from said welding zone, said isolating means comprising a jet of inert gas provided adjacent said welding zone during joining procedures, said jet effectively oriented in a direction such that its resultant vector is away from said vision area.

24. The apparatus of claim 23, wherein said jet is provided via a supply line having a first end connected to a sources of inert gas, and a nozzle, wherein a vectored jet of inert gas is applied adjacent said welding zone, such that smoke, spatter and other welding debris are directed away from said vision area.

25. The apparatus of claim 24, wherein said supply line and nozzle are positioned downstream of said vision area such that said vectored jet of inert gas is applied to said welding zone substantially along said longitudinal axis.

26. An apparatus for automatically and continuously aligning a welding device along approximately the center of a continuous gap defined by confronting proximal edges of a at least two workpieces to be joined, wherein relative motion between said welding device and said workpieces along a longitudinal axis substantially parallel to said gap permits joining of said confronting edges of said workpieces by said welding device by application of welding energy at a welding zone along said edges, said aligning apparatus comprising:
(a) an imaging system for determining the location of said gap center relative to a predetermined two dimensional coordinate system, wherein an image of a vision area spaced downstream of said welding zone along said longitudinal axis is produced, said vision area designed to span said gap and include said confronting edges of said workpieces;
(b) means for receiving and transforming said image of said vision area into an output signal defining the location of said gap center relative to said welding device;
(c) means for automatically adjusting the relative positions of said welding device said center of said gap in response to said output signal such that said welding device and said center are continuously aligned at all times;
(d) means for effectively isolating said vision area from said welding zone; and
(e) a shroud connected to the lowermost portion of said imaging system adjacent said vision area, said shroud effectively protecting said imaging system from welding debris and facilitating concentration of illumination onto said vision area.

27. An apparatus for automatically and continuously aligning a laser beam long approximately the center of continuous gap defined by confronting proximal edges of at least two workpieces, wherein relative motion between said laser beam and said workpieces occurs along a longitudinal axis substantially parallel to said gap to permit welding or cutting of said workpieces by said laser beam, said aligning apparatus comprising:
(a) a vision system for determining the location of said center relative to a predetermined two dimensional coordinate system, said vision system further comprising:
(1) a line scan camera for producing an image of a vision area spaced downstream of said laser beam along said longitudinal axis, said vision area designed to span said gap and to include said confronting edges of said workpieces;
(2) an optics system operably attached to said line scan camera, wherein said line scan camera may be substantially spaced from said vision area while maintaining the reception of said vision area;
(3) a fiber optic illuminator connected to the lowermost portion of said optics system; and
(4) an independent source of illumination connected to said fiber optic illuminator by means of a coherent fiber optics bundle, wherein illumination is supplied to said vision area coaxial to said optics system;
(b) means for receiving said image and transforming it into an output signal defining the location of said gap center relative to said laser beam;
(c) a first translation table movable parallel to said longitudinal axis for providing said relative motion between said laser beam and said workpieces, said workpieces being fixtured to said first translation table so that said workpieces move in accordance therewith;
(d) means for automatically adjusting the relative locations of said laser beam and said gap center in response to said output signal such that said laser beam and said gap center are continuously maintained in alignment; and
(e) a jet of inert gas provided adjacent the point of impingement of said laser beam with said gap and effectively oriented such that its resultant vector is away from said vision area.

28. The apparatus of claim 27, wherein said jet of inert gas is provided by a supply line having a first end connected t a supply of inert gas and a nozzle, said nozzle attached adjacent said optics system and downstream of said vision area adjacent said gap center.

29. An apparatus for automatically and continuously aligning a laser beam along approximately the center of a continuous gap defined by confronting proximal edges of at least two workpieces, wherein relative motion between said laser beam and said workpieces occurs along a longitudinal axis substantially parallel to said gap to permit welding or cutting of said workpieces of said laser beam, said aligning apparatus comprising:
(a) a vision system for determining the location of said center relative to a predetermined two dimensional coordinate system, said vision system further comprising:
(1) a line scan camera for producing an image of a vision area spaced downstream of said laser beam along said longitudinal axis, said vision area designed to span said gap and to include said confronting edges of said workpieces;
(2) an optics system operably attached to said line scan camera, wherein said line scan camera may be substantially spaced from said vision area while maintaining the reception of said vision area;
(3) a fiber optic illuminator connected to the lowermost portion of said optics system; and
(4) an independent source of illumination connected to said fiber optic illuminator be means of a coherent fiber optics bundle, wherein illumination is supplied to said vision area coaxial to said optics system;
(b) means for receiving said image and transforming it into an output signal defining the location of said gap center relative to said laser beam;
(c) a first translation table movable parallel to said longitudinal axis for providing said relative motion between said laser beam and said workpieces, said workpieces being fixtured to said first translation table so that said workpieces move in accordance therewith;

(d) means for automatically adjusting the relative locations of said laser beam and said gap center in response to said output signal such that said laser beam and said gap center are continuously maintained in alignment; and (e) a shroud attached to the lowermost portion of said optics system to protect said optics system frog debris, smoke and the like.

30. An apparatus for automatically and continuously aligning a laser beam long approximately the center of a continuous gap defined by confronting proximal edges of at least two workpieces, wherein relative motion between said laser beam and said workpieces occurs along a longitudinal axis substantially parallel to said gap to permit welding or cutting of said workpieces by said laser beam, said aligning apparatus comprising:

(a) a vision system for determining the location of said center relative to a predetermined two dimensional coordinate system, said vision system further comprising:

(1) a line scan camera for producing an image of a vision area spaced downstream of said laser beam along said longitudinal axis, said vision area designed to span said gap and to include said confronting edges of said workpieces;

(2) an optics system operably attached to said line scan camera, wherein said line scan camera may be substantially spaced from said vision area while maintaining the reception of said vision area;

(3) a fiber optic illuminator connected to the lowermost portion of said optics system; and (4) an independent source of illumination connected to said fiber optic illuminator by means of a coherent fiber optics bundle, wherein illumination is supplied to said vision area coaxial to said optics system;

(b) means for receiving said image and transforming it into an output signal defining the location of said gap center relative to said laser beam;

(c) a first translation table movable parallel to said longitudinal axis for providing said relative motion between said laser beam and said workpieces, said workpieces being fixtured to said first translation table so that said workpieces move in accordance therewith;

(d) means for automatically adjusting the relative locations of said laser beam and said gap center in response to said output signal such that said laser beam and said gap center are continuously maintained in alignment;

(e) means for directing said laser beam to a defined zone along said longitudinal axis, and directing means comprising at least one reflecting mirror which reflects said laser beam through laser focusing optics to said zone; and (f) a motor operably connected to said reflecting mirror, wherein said reflecting mirror may be rotated to allow slight adjustments in the direction or said laser beam.

* * * * *

UNITED STATES PATENT AND TRADEMARK OFFICE
CERTIFICATE OF CORRECTION

PATENT NO. : 5,045,668

DATED : September 3, 1991

INVENTOR(S) : Gary L. Neiheisel, William W. Nagle, et al

It is certified that error appears in the above-identified patent and that said Letters Patent is hereby corrected as shown below:

Claim 23 - Column 18 - line 47 - "deice" should be deleted and replaced with --device--.

Claim 24 - Column 19 - line 6 - "sources" should be deleted and replaced with --source--.

Claim 26 - Column 19 - line 18 - "a" should be deleted.

Claim 26 - Column 19 - line 37 - "device said" should be deleted and replaced with --device and said--.

Claim 27 - Column 19 - line 50 - "a" should be inserted before --continuous--.

Claim 28 - Column 20 - line 30 - "connected t" should be deleted and replaced with --connected to--.

UNITED STATES PATENT AND TRADEMARK OFFICE
CERTIFICATE OF CORRECTION

PATENT NO. : 5,045,668

DATED : September 3, 1991

INVENTOR(S) : Gary L. Neiheisel, William W. Nagle, et al

It is certified that error appears in the above-identified patent and that said Letters Patent is hereby corrected as shown below:

Claim 29 - Column 20 - line 58 - "be" should be deleted and replaced with --by--.

Claim 29 - Column 21 - line 10 - "frog" should be deleted and replaced with --from--.

Claim 30 - Column 22 - line 25 - "and" should be deleted and replaced with --said--.

Claim 30 - Column 22 - line 31 - "or" should be deleted and replaced with --of--.

Signed and Sealed this

Nineteenth Day of January, 1993

*Attest:*

DOUGLAS B. COMER

*Attesting Officer*     *Acting Commissioner of Patents and Trademarks*